(12) United States Patent
Wu et al.

(10) Patent No.: US 8,503,732 B2
(45) Date of Patent: Aug. 6, 2013

(54) IMAGE GENERATING DEVICE, STATIC TEXT DETECTING DEVICE AND METHOD THEREOF

(75) Inventors: Hung Wei Wu, Tai Pei (TW); Chih-Yu Chang, Hsin Chu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 932 days.

(21) Appl. No.: 12/619,337

(22) Filed: Nov. 16, 2009

(65) Prior Publication Data
US 2010/0328532 A1 Dec. 30, 2010

(30) Foreign Application Priority Data
Jun. 30, 2009 (TW) .............................. 98122102 A

(51) Int. Cl.
*G06K 9/00* (2006.01)
*G06K 9/34* (2006.01)

(52) U.S. Cl.
USPC ........... 382/107; 382/175; 382/171; 382/178; 382/294; 348/267; 348/208.99; 348/263; 345/629

(58) Field of Classification Search
None
See application file for complete search history.

(56) References Cited

U.S. PATENT DOCUMENTS

| | | | | |
|---|---|---|---|---|
| 4,968,132 A | * | 11/1990 | Ferren | 352/46 |
| 4,987,480 A | * | 1/1991 | Lippman et al. | 348/396.1 |
| 5,940,139 A | * | 8/1999 | Smoot | 348/584 |
| 6,205,231 B1 | * | 3/2001 | Isadore-Barreca et al. | 382/103 |
| 6,285,797 B1 | * | 9/2001 | Lubin et al. | 382/254 |
| 6,393,163 B1 | * | 5/2002 | Burt et al. | 382/294 |
| 7,356,439 B2 | * | 4/2008 | Jung | 702/150 |
| 7,359,552 B2 | * | 4/2008 | Porikli | 382/190 |
| 7,375,769 B2 | * | 5/2008 | Yui | 348/584 |
| 7,860,311 B2 | * | 12/2010 | Chen et al. | 382/173 |
| 7,865,015 B2 | * | 1/2011 | Chen et al. | 382/173 |
| 8,000,498 B2 | * | 8/2011 | Shih et al. | 382/103 |
| 2003/0011715 A1 | * | 1/2003 | Kastelic | 348/589 |
| 2003/0174253 A1 | * | 9/2003 | Ito et al. | 348/699 |
| 2004/0017389 A1 | * | 1/2004 | Pan et al. | 345/723 |
| 2004/0098754 A1 | * | 5/2004 | Vella et al. | 725/135 |
| 2009/0136092 A1 | * | 5/2009 | Springer et al. | 382/107 |
| 2012/0093413 A1 | * | 4/2012 | Kuo | 382/173 |

FOREIGN PATENT DOCUMENTS

| | | | |
|---|---|---|---|
| EP | 1424851 | * | 6/2004 |
| EP | 1549048 | * | 6/2005 |

* cited by examiner

*Primary Examiner* — Nancy Bitar
(74) *Attorney, Agent, or Firm* — Muncy, Geissler, Olds & Lowe, PLLC

(57) ABSTRACT

An image generating device and a method thereof are disclosed in the present invention. The image generating device and method may find out true motion for static text strings. The image generating device and method detect static text angles from consecutive frames and use a 3D-static text filter to recover correct motion vector fields. After our Static Text Detector fixing, the static text strings like subtitles can get more accurate motion vector and improve video quality.

20 Claims, 10 Drawing Sheets

IMAGE GENERATING DEVICE, STATIC TEXT DETECTING DEVICE AND METHOD THEREOF

BACKGROUND OF THE INVENTION (a) Field of the Invention

The invention relates to a frame rate up-conversion (FRC) technique, particularly to an image generating device with the function of detecting static texts and a method thereof.

(b) Description of the Related Art

The frame rate up-conversion (FRC) technique is used for increasing the frame rate of a video source and has been applied in various fields, such as low-bit network video transmission for bandwidth-saving, converting a video source with a frame rate of 25 Hz into a higher frame rate for reducing frame juddering, and applying in hold-type liquid crystal displays (LCD) for avoid frame blurring and achieving clear image quality.

Most of the frame rate up-conversion (FRC) techniques use motion estimation (ME) to calculate the motion vector of an object and perform motion compensation interpolation (MCI) to allocate the moving object in different frames. Most of the motion estimation techniques use a block matching estimation algorithm to calculate the motion vector having the minimum of the sum of absolute difference (SAD). However, in many circumstances, many motion estimation techniques are easily trapped in the minimum of a local SAD, that is, the motion vector having the minimum of a local SAD is not necessary to be the real motion vector of the object and even the motion vector having the minimum of a global SAD is not necessary to be the real motion vector of the object.

Furthermore, while the block matching estimation algorithm in the prior art is used to process estimation, the correct estimation for image signals including static texts, such as captions, signs, etc. cannot be made when the background of the image contains moving object(s). As shown in FIG. 1, the upper part of the figure shows a preceding frame F0 and the lower part shows a current frame F1. For the preceding frame F0 as an example, the label "T" indicates a static text and the label "B" indicates a background object, the label "Mv" indicates a motion vector. When the image changes from the frame F0 to F1, the block matching estimation algorithm in the prior art will estimate an incorrect motion vector Mv due to the motion of the background object "B". Such incorrect estimation often results in static text juddering or moving with the moving object to thereby lower the image displaying quality.

BRIEF SUMMARY OF THE INVENTION

In order to remove the static text juddering or moving problem in the image, one object of the invention is to provide an image generating device and a method thereof.

One embodiment of the invention provides an image generating device. The image generating device is to receive a current image and a preceding image to generate at least one interpolated image. The image generating device comprises a vector estimation circuit, a static text detecting circuit, and a motion compensation interpolation circuit. The vector estimation circuit performs block matching estimation on a target block of the current image and a predetermined search block of the preceding image to generate a temporary motion vector of the target block and a plurality of motion estimation errors corresponding to the target block. The static text detecting circuit receives the temporary motion vector of the target block, the current image, and the preceding image to detect static texts of the current image and the preceding image, and then corrects the temporary motion vector according to the result of detecting static texts to generate a corrected motion vector of the target block. The motion compensation interpolation circuit performs image interpolation according to all the corrected motion vectors of the current image, the current image, and the preceding image to generate the at least one interpolated image.

One embodiment of the invention provides a static text detecting circuit. The static text detecting circuit comprises a static text angle detecting circuit and a data filtering circuit. The static text angle detecting circuit receives a current image and a preceding image, divides the current and preceding images into the same number of blocks, separately detects the angle of each pixel in each block of the current image and the preceding image according to at least one angle, and counts the number of the same angles of the pixels in each block of the current image and the corresponding block of the preceding image. The data filtering circuit determines the number of effective angles in each block of the current image and the preceding image according to the number of the same angles, and compares the number of effective angles in each block with a predetermined value to decide whether the block comprises any static text or not so as to generate static text flag data as a reference for image motion vector correction.

One embodiment of the invention provides a method for generating an image, comprising the following steps: at first, receiving a preceding image and a current image and performing motion vector estimation on these two frames, the current image and the preceding image; performing static text detection on these two images; determining whether the block and the corresponding block in these two images comprise all or part of static texts or not; if yes, setting the motion vector of the block comprising static texts to zero; if not, setting the motion vector of the block comprising no static text to its original vector; and then performing image interpolation on the preceding image and the current image according to the corrected motion vector to generate at least one interpolated image.

Other purposes and advantages of the invention can be understood by the following disclosed technical characteristics of the invention. Accompanying with the following figures, examples and claims, the above and other objectives and advantages of the invention will be described in detail in the following.

DETAILED DESCRIPTION OF THE INVENTION

The following describes several preferred embodiments of the inventions, such as various electric circuits, elements, and related methods. Those who are skilled in the art should understand that the invention can be implemented by various methods, not limited by the following embodiments or characteristics in the embodiments. The well-known details will not be repeatedly described to avoid distracting the attention from the key point of the invention.

Furthermore, the image inputted into the image generating device according to the invention may be a frame or a field. The following examples are described by using a frame.

Figure 1:
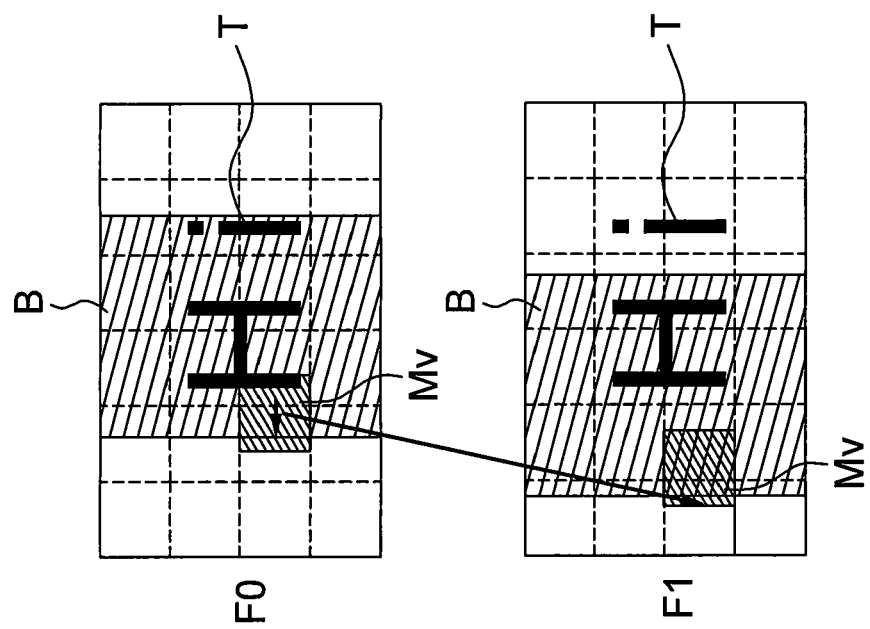
FIG. 1 shows a schematic diagram illustrating an example of static texts and a background object in a frame.
Figure 2A:
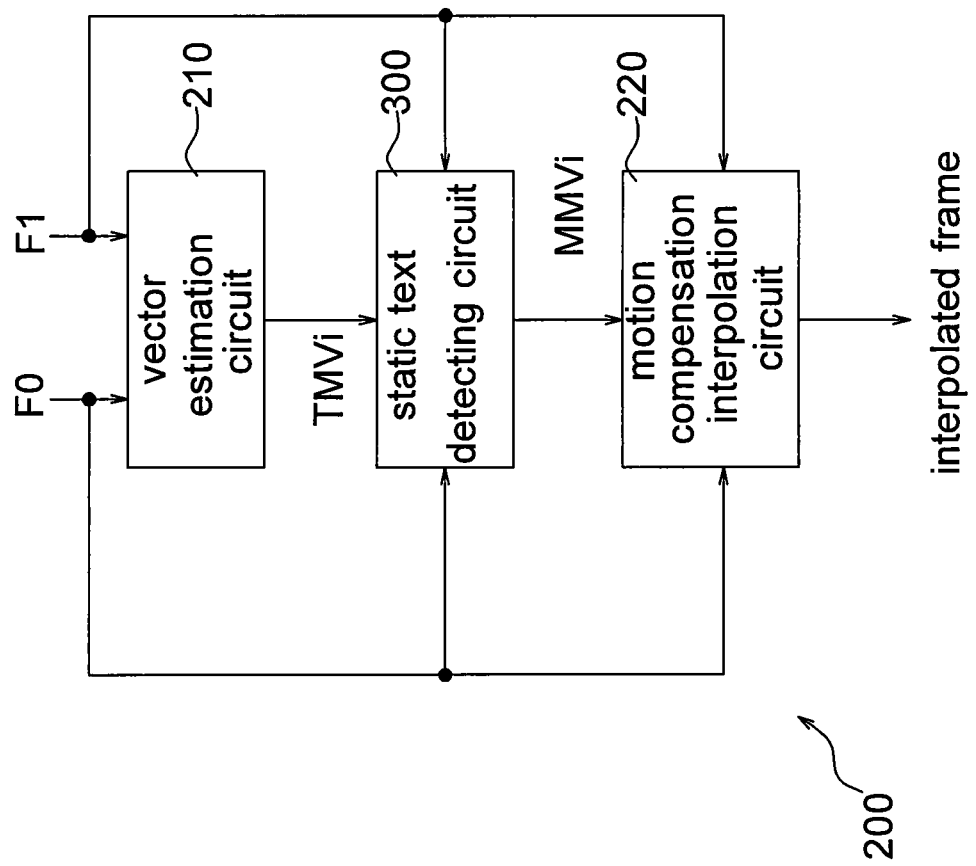
FIG. 2A shows a structure block diagram illustrating the image generating device according to one embodiment of the invention.

FIG. 2A shows a structure block diagram illustrating the image generating device according to one embodiment of the invention. Referring to FIG. 2A, the image generating device 200 according to the invention comprises a vector estimation circuit 210, a static text detecting circuit 300, and a motion compensation interpolation circuit 220. The static text detecting circuit 300 may be an N-dimensional static text detecting circuit where N is a positive integer and less than infinity. For example, it may be a 3D-static text detecting circuit.

Figure 2B:
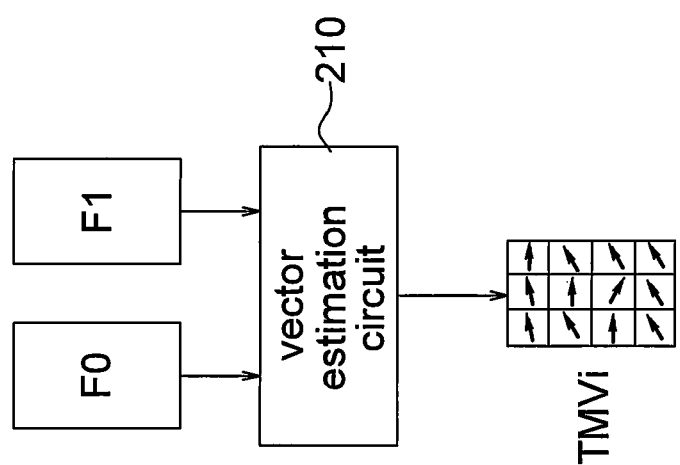
FIG. 2B shows a structure block diagram illustrating the vector estimation circuit according to one embodiment of the invention.

As shown in FIG. 2A and FIG. 2B, the vector estimation circuit 210 receives a current frame F1 and a preceding frame F0, divides the current frame F1 and the preceding frame F0 into the same number of blocks, and compares a target block with a predetermined search block of the preceding frame F0 to calculate a plurality of motion estimation errors. The vector estimation circuit 210 compares these motion estimation errors to acquire the temporary motion vector $TMV_i$ of the target block and a plurality of motion estimation errors corresponding to the target block. Then, after processing the whole frame by repeating the above operation, all the temporary motion vectors $TMV_i$ outputted by the vector estimation circuit 210 are shown in FIG. 2B.

In the above, the temporary motion vector $TMV_i$ of the target block may be the motion vector having the minimum motion estimation error. It should be noted that the invention is not limited to the above example. In another embodiment, a target block may be compared with a predetermined search block of the current frame F1 to calculate a plurality of motion estimation errors and thus to acquire the temporary motion vector $TMV_i$ of the target block.

The above motion estimation errors may be acquired by various algorithms, such as SAD (sum of absolute difference) algorithm, MAD (mean absolute difference) algorithm, MSE (mean square error) algorithm, or the current or future algorithm. The following embodiment uses the SAD value calculated by the SAD algorithm as the motion estimation error. Thus, a plurality of SAD values calculated by the vector estimation circuit 210 form a SAD curve and then the magnitude of the SAD curve corresponds to the size of the above predetermined search block. Those who are skilled in the art should understand that there are various methods to calculate the temporary motion vector $TMV_i$. Its further details will not be given hereinafter.

As shown in FIG. 2A, the vector estimation circuit 210 transmits the temporary motion vector $TMV_i$ of the target block to the static text detecting circuit 300.

The static text detecting circuit 300 receives the temporary motion vector $TMV_i$ of each target block, and performs static text detection and motion vector correction on the frames F0 and F1 to generate the corrected motion vector $MMV_i$ of each target block.

After the motion compensation interpolation circuit 220 sequentially receives all the corrected motion vectors $MMV_i$ of the current block, the motion compensation interpolation circuit 220 performs image interpolation according to the current frame F1 and the preceding frame F0 to thereby generate at least one interpolated frame.

Figure 3A:
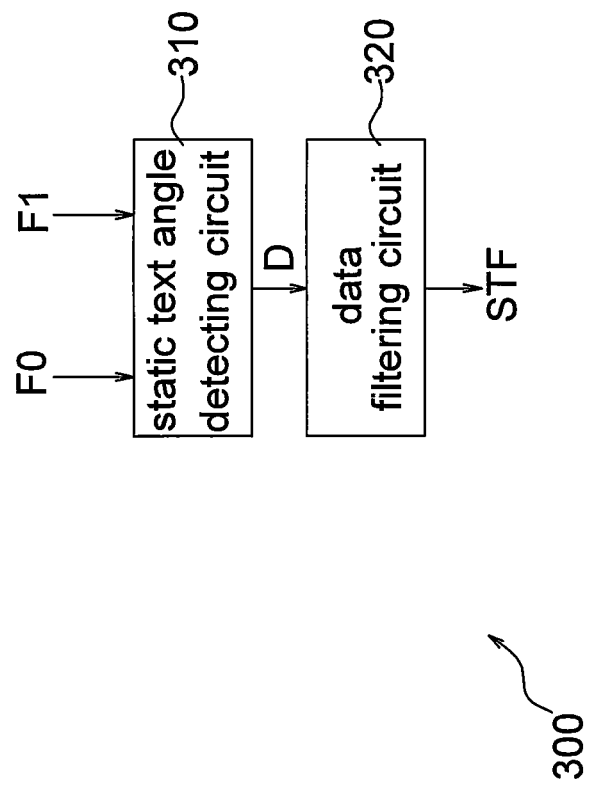
FIG. 3A shows a structure block diagram illustrating the static text detecting circuit according to one embodiment of the invention.

FIG. 3A shows a structure block diagram illustrating the static text detecting circuit 300 according to one embodiment of the invention. The static text detecting circuit 300 comprises a static text angle detecting circuit 310 and a data filtering circuit 320. The static text angle detecting circuit 310 receives a current frame F1 and a preceding frame F0, divides the current frame F1 and the preceding frame F0 into the same number of blocks. The number of divided blocks of the frame is the same as the number of blocks divided by the vector estimation circuit 210. Then, the static text angle detecting circuit 310 separately detects the angle of each pixel in each block of each frame according to at least one angle and counts the number of the same angles of the pixels in each block of the frame F1 and the corresponding block of the frame F0. The data filtering circuit 320 determines the number of effective angles in each block of the frames F0 and F1 according to the number of the same angles, and compares the number of effective angles in each block with a first predetermined value to decide whether the block comprises any static text or not.

For a static text the two pixels at the same position in the frame F0 and the frame F1 have the same angle while for a moving object only one of the two pixels at the same position in the frame F0 and the frame F1 has an angle and the other pixel does not have an angle. Therefore, when the number of effective angles in each block is larger than the first predetermined value, the block indeed has an angle and thus the block has static text(s). According to this information, the temporary motion vector $TMV_i$ in each target block can be corrected. For example, when a block comprises static text(s), the temporary motion vector $TMV_i$ of the block is set to zero so as to generate the corrected motion vector $MMV_i$. On the contrary, when a block comprises no static text, the temporary motion vector $TMV_i$ of the block is not changed and the value of the temporary motion vector $TMV_i$ is treated as the corrected motion vector.

Figure 3B:
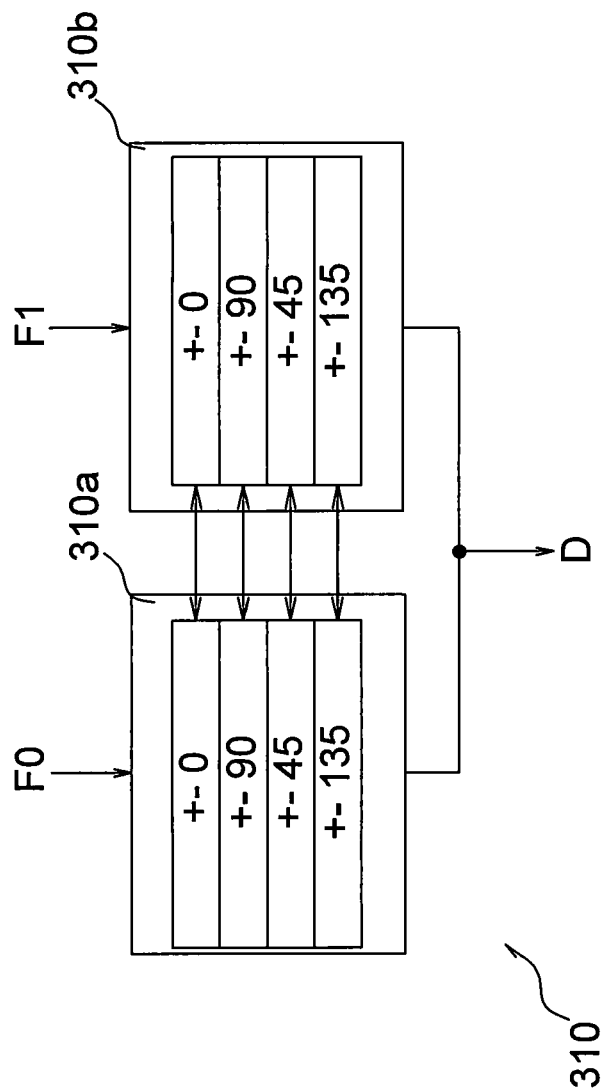
FIG. 3B shows a structure block diagram illustrating the static text angle detecting circuit according to one embodiment of the invention.

FIG. 3B shows a structure block diagram illustrating the static text angle detecting circuit 310 according to one embodiment of the invention. The static text angle detecting circuit 310 comprises a first static text angle detecting unit 310a and a second static text angle detecting unit 310b. The first static text angle detecting unit 310a detects at least one angle of each block in the preceding frame F0. For example, as shown in FIG. 3B, the first static text angle detecting unit 310a comprises 8 sets of angle detecting units for detecting if each block in the preceding frame F0 has these 8 sets of angles: +0, −0, +90, −90, +45, −45, +135, −135 degrees. Certainly, the invention is not limited to this example. In another embodiment, N sets of angles are detected where N is a positive integer less than infinity. The second static text angle detecting unit 310b also comprises 8 sets of angle detecting units for detecting if each block in the current frame F1 has these 8 sets of angles. The number of detected angles of the two static text angle detecting units 310a and 310b is substantially the same.

At first, the first static text angle detecting unit 310a is used as an example for illustration.

The first static text angle detecting unit 310a receives the preceding frame F0 and executes the matrix operation to perform angle detection on each block of the preceding frame F0. For example, the predetermined value 30 for determining existence of an angle is assumed. Then, calculating if a block has +0 degree in the preceding frame F0 may be processed as follows: the pixel value of a block in preceding frame F0, for example, $$\begin{bmatrix} 40 & 40 & 40 \\ 40 & 40 & 40 \\ 0 & 0 & 0 \end{bmatrix},$$

multiplied by the testing matrix of +0 degree, $$\begin{bmatrix} 1 & 1 & 1 \\ 0 & 0 & 0 \\ -1 & -1 & -1 \end{bmatrix},$$

is 40*1+40*1+40*1+40*0+40*0+40*0+0*(−1)+ 0*(−1)+0* (−1)=120. The result of this calculation is 120, that is larger than 30, and thus this block has +0 degree. Assuming that the pixel value of the corresponding block in the current frame F1 is $$\begin{bmatrix} 40 & 40 & 40 \\ 40 & 40 & 40 \\ 0 & 0 & 0 \end{bmatrix},$$

similarly the testing matrix of +0 degree, $$\begin{bmatrix} 1 & 1 & 1 \\ 0 & 0 & 0 \\ -1 & -1 & -1 \end{bmatrix},$$

is used to test and the same value 120 is obtained, that is also larger than 30. Therefore, the same block in the two frames has an angle of +0 degree. Thus, the direction counter (not shown in the figure) provided in the static text detecting circuit is added by one.

For other angles of each block in the two frames, the following matrixes may be used in operations. Based on the above description, those who are skilled in the art should understand how to calculate the angles that each block has. If the values calculated by the total of three sets of angles in the above 8 sets of angles of a block are larger than the above predetermined value, 30, the value of the direction counter of the block is 3. It should be noted that the matrix or predetermined value for the invention is not limited to this example. In another example, various N*M matrixes may be used and the predetermined value may be X where N, M, X are positive integers less than infinity.

The following shows the matrixes for 8 sets of angles:

$$\text{testing matrix of } +0 \text{ degree } \begin{bmatrix} 1 & 1 & 1 \\ 0 & 0 & 0 \\ -1 & -1 & -1 \end{bmatrix};$$

$$\text{testing matrix of } -0 \text{ degree } \begin{bmatrix} -1 & -1 & -1 \\ 0 & 0 & 0 \\ 1 & 1 & 1 \end{bmatrix};$$

$$\text{testing matrix of } +90 \text{ degrees } \begin{bmatrix} 1 & 0 & -1 \\ 1 & 0 & -1 \\ 1 & 0 & -1 \end{bmatrix};$$

$$\text{testing matrix of } -90 \text{ degrees } \begin{bmatrix} -1 & 0 & 1 \\ -1 & 0 & 1 \\ -1 & 0 & 1 \end{bmatrix};$$

$$\text{testing matrix of } +45 \text{ degrees } \begin{bmatrix} 1 & 1 & 0 \\ 1 & 0 & -1 \\ 0 & -1 & -1 \end{bmatrix};$$

$$\text{testing matrix of } -45 \text{ degrees } \begin{bmatrix} -1 & -1 & 0 \\ -1 & 0 & 1 \\ 0 & 1 & 1 \end{bmatrix};$$

$$\text{testing matrix of } +135 \text{ degrees } \begin{bmatrix} 0 & 1 & 1 \\ -1 & 0 & 1 \\ -1 & -1 & 0 \end{bmatrix}; \text{ and}$$

$$\text{testing matrix of } -135 \text{ degrees } \begin{bmatrix} 0 & -1 & -1 \\ 1 & 0 & -1 \\ 1 & 1 & 0 \end{bmatrix}.$$

It should be noted that the matrix operation is as follows: taking +0 degree as an example, $$\begin{bmatrix} P11, & P12, & P13 \\ P21, & P22, & P23 \\ P31, & P32, & P33 \end{bmatrix} \begin{bmatrix} 1 & 1 & 1 \\ 0 & 0 & 0 \\ -1 & -1 & -1 \end{bmatrix} = P11*1 + P12*1 + P13*1 +$$

$$P21*0 + P22*0 + P23*0 + P31*(-1) + P32*(-1) + P33*(-1).$$

Those who are skilled in the art should understand that the above matrix operation is only an example and the operation on different types of matrixes can be deduced by analogy.

Besides, when the background of the current frame F1 moves down, the pixel value of a block in the preceding frame F0 is $$\begin{bmatrix} 40 & 40 & 40 \\ 40 & 40 & 40 \\ 0 & 0 & 0 \end{bmatrix},$$

and the pixel value of the corresponding block in the current frame F1 is $$\begin{bmatrix} 40 & 40 & 40 \\ 40 & 40 & 40 \\ 40 & 40 & 40 \end{bmatrix}.$$

If the matrix of +0 degree is used in matrix operation, the operation value of the block of the preceding frame F0 is 120 while the operation value of the block of the current frame F1 is 0. Thus, the pixel in this block has no +0 degree. The value of the direction counter is unchanged.

The values of a plurality of direction counters of each pixel in each block can be calculated by repeating the above operation on the pixel value, that is, the number of pixels having +0 degree in this block can be acquired. The number of pixels having other angles −0, +90, −90, +45, −45, +135, −135 degrees can be also acquired. Therefore, there are 8 counting values from 8 direction counters. If the counting value is larger than the second predetermined value, the angle is an effective angle and the angle counter is added by one. Thus, the number of effective angles of each block can be acquired. For example, assuming the 8 counting values of the 8 direction counters are "0, 3, 0, 6, 22, 12, 0, 0" for a block and the second predetermined value is set to 10, there are two counting values larger than 10. Thus, the value of the angle counter is 2, that is, there are 2 effective angles in this block. By repeating the above steps, the number of effective angles corresponding to each block in the frame shown on the left hand side of FIG. 3C can be acquired, that is, the initial static text flag data.

Figure 3C:
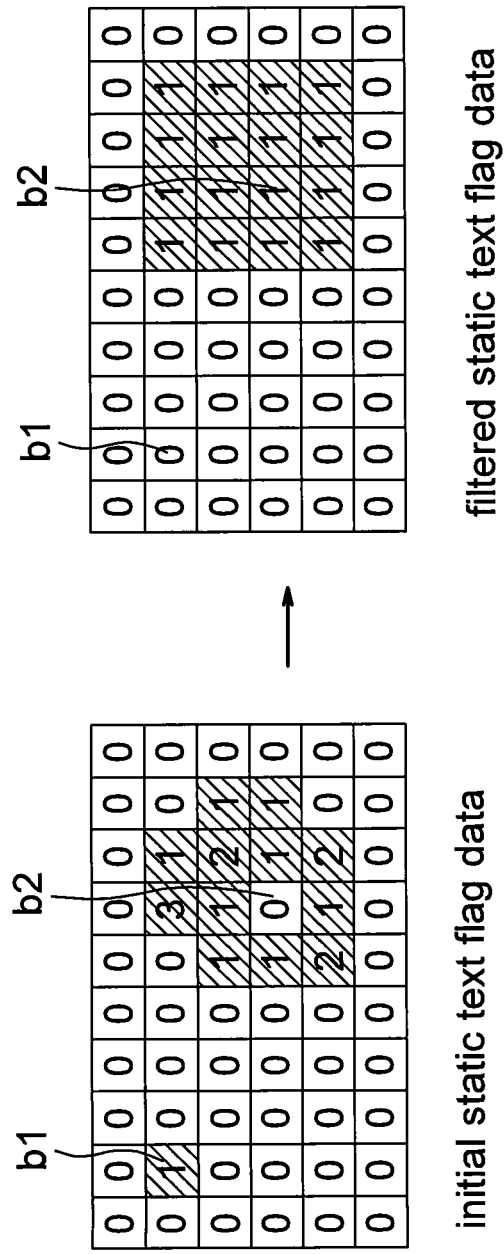
FIG. 3C shows a schematic diagram illustrating the initial static text flag data and the filtered static text flag data according to one embodiment of the invention.

In FIG. 3C, the initial static text flag data of the frame is shown on the left hand side of the figure where the value "0" indicates the block does not have any effective angle, the value "1" indicates the block has one effective angle, the value "2" indicates the block has two effective angles, and the value "3" indicates the block has three effective angles, and so on. The data shown in the figure is the initial static text flag data D of the static text angle detecting circuit 310.

Figure 3D:
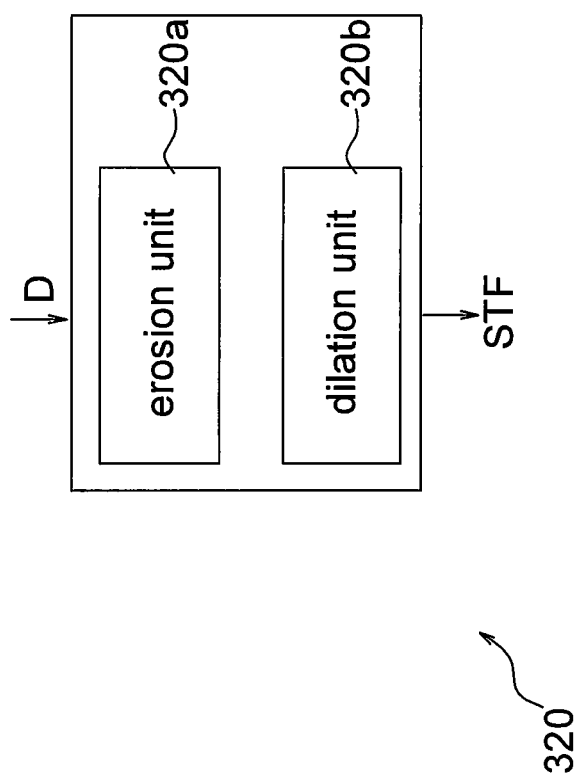
FIG. 3D shows a structure block diagram illustrating the data filtering circuit according to one embodiment of the invention.

FIG. 3D shows a structure block diagram illustrating the data filtering circuit 320 according to one embodiment of the invention. The data filtering circuit 320 comprises an erosion unit 320*a* and a dilation unit 320*b*. The data filtering circuit 320 receives the initial static text flag data D and the initial static text flag data D undergoes an erosion process by the erosion unit 320*a* and then undergoes a dilation process by the dilation unit 320*b* so that the filtered static text flag data D' is generated. The erosion process of the erosion unit 320*a* is that, for example, referring to FIG. 3C, the surrounding blocks of the block b1 have no angle and thus the erosion unit 320*a* determines the weight of the block b1 is lower based on the predetermined weighting rule to thereby change the block b1 from 1 to 0. The other higher value 3 or 2 in the block may be changed to 1 by the erosion unit 320*a* for unified processing. The dilation process of the dilation unit 320*b* is that, for example, the block b2 is changed from 0 to 1. Although the block b2 is 0, the surrounding blocks of the block b2 have angles and thus the dilation unit 320*b* determines the weight of the block b2 is higher based on the predetermined weighting rule to thereby change the block b2 from 0 to 1. By repeating the above steps, the value of each block of the filtered static text flag data D' shown on the right hand side of the figure can be acquired. These values are the static text flags. According to the above description, those who are skilled in the art should understand how to acquire the filtered static text flag data D' shown on the right hand side of the figure. Thus, its further details will not be given hereinafter.

In one embodiment, the weighting rule of the above erosion unit 320*a* comprises:
1. eroding a block while this block has a total of one angle and the surrounding blocks of this block do not comprise a plurality of angles and setting the text flag of this block to false; and/or
2. eroding a block while the sum of the total number of angles of the surrounding blocks of this block is less than a predetermined value and setting the text flag of this block to false.

In one embodiment, the weighting rule of the above dilation unit 320*b* comprises:
1. dilating a block while the blocks on the left and right of this block have a plurality of angles and setting the text flag of this block to true; and/or
2. dilating a block while the blocks on the top and bottom of this block have a plurality of angles and setting the text flag of this block to true; and/or
3. dilating a block while the sum of the total number of blocks having a plurality of angles surrounding the block is more than a predetermined value and setting the text flag of this block to true; and/or
4. dilating a block while the sum of the total number of angles of the surrounding blocks of this block is more than a predetermined value and setting the text flag of this block to true.

The invention is not limited to the above example and other current or future weighting rules may be used.

In FIG. 3C, for the value in the frame shown on the right hand side of the figure, the block having a value of 1 indicates the block comprises all or part of static texts. According to these static text flags, the static text detecting circuit 300 processes the temporary motion vector of each corresponding static text flag. In one embodiment, the static text detecting circuit 300 corrects the temporary motion vectors according to these corresponding static text flags to generate the corrected motion vectors to the motion compensation interpolation circuit. For example, as the value of the flag of a block is 1, it indicates the block comprises static text(s). Then, the static text detecting circuit 300 changes the value of the temporary motion vector corresponding to this block to 0 and generates a corrected motion vector supplied to the motion compensation interpolation circuit 220 as a reference for frame interpolation. On the contrary, as the value of the flag of a block is 0, it indicates the block comprises no static text. Thus, the value of the temporary motion vector corresponding to this block is unchanged and used as the value of the corrected motion vector to be outputted to the motion compensation interpolation circuit 220 as a reference for frame interpolation.

Figure 4:
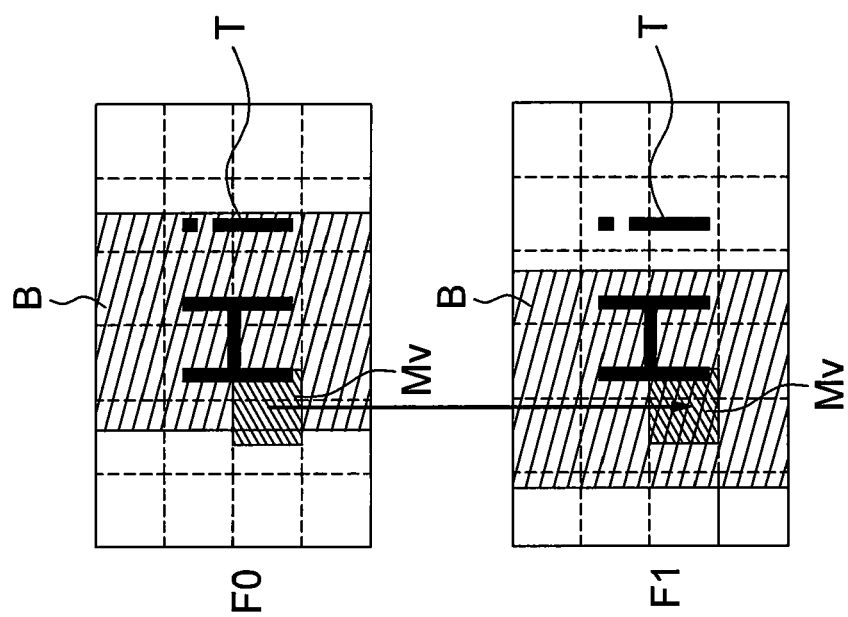
FIG. 4 shows a schematic diagram illustrating an example of static texts and a background object in a frame according to the invention.

Following the above steps, the motion compensation interpolation circuit 220 acquires the correct motion vector of each block and then correctly calculates at least one interpolated frame based on the preceding frame F0 and the current frame F1 so that the static texts keep unmoving while the background B in the image is moving, as shown in FIG. 4. Therefore, the problem of static text juddering or moving due to incorrect motion vectors in the prior art can be solved so that the image quality can be enhanced.

Figure 5:
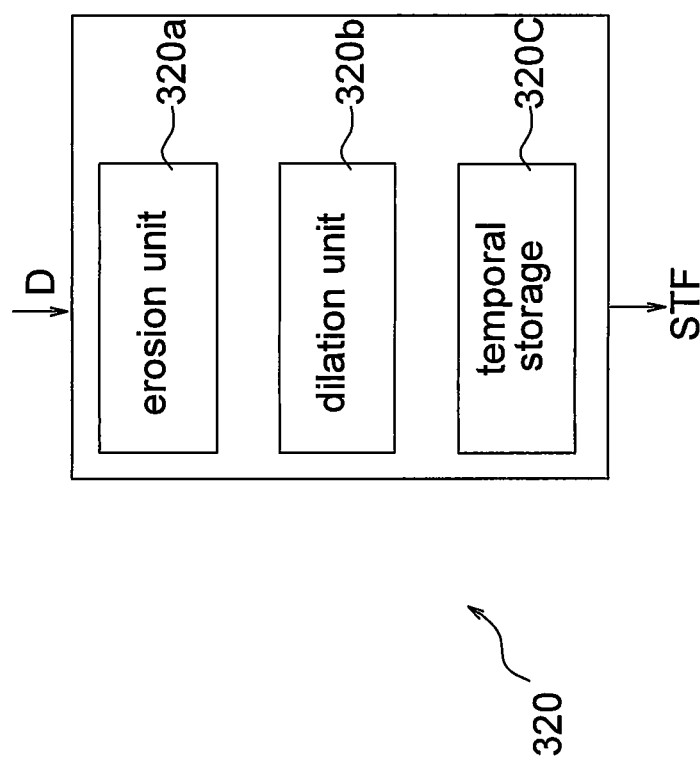
FIG. 5 shows a structure block diagram illustrating the data filtering circuit according to one embodiment of the invention.

Moreover, as shown in FIG. 5, the data filtering circuit 320 further comprises a temporal storage 320*c* for storing and detecting the filtered static text flags of a plurality of frames. While the filtered static text flags of Z consecutive frames are all the same, the temporal storage 320*c* determining that the filtered static text flags are correct for the static text detecting circuit 300 to perform motion vector correction where the value Z is more than 1 and less than infinity. If the flag of one of the frames is different, the static text flag will not be used and the static text detection on the frame will be reprocessed. Therefore, the accuracy in detecting static texts becomes higher.

Figure 6:
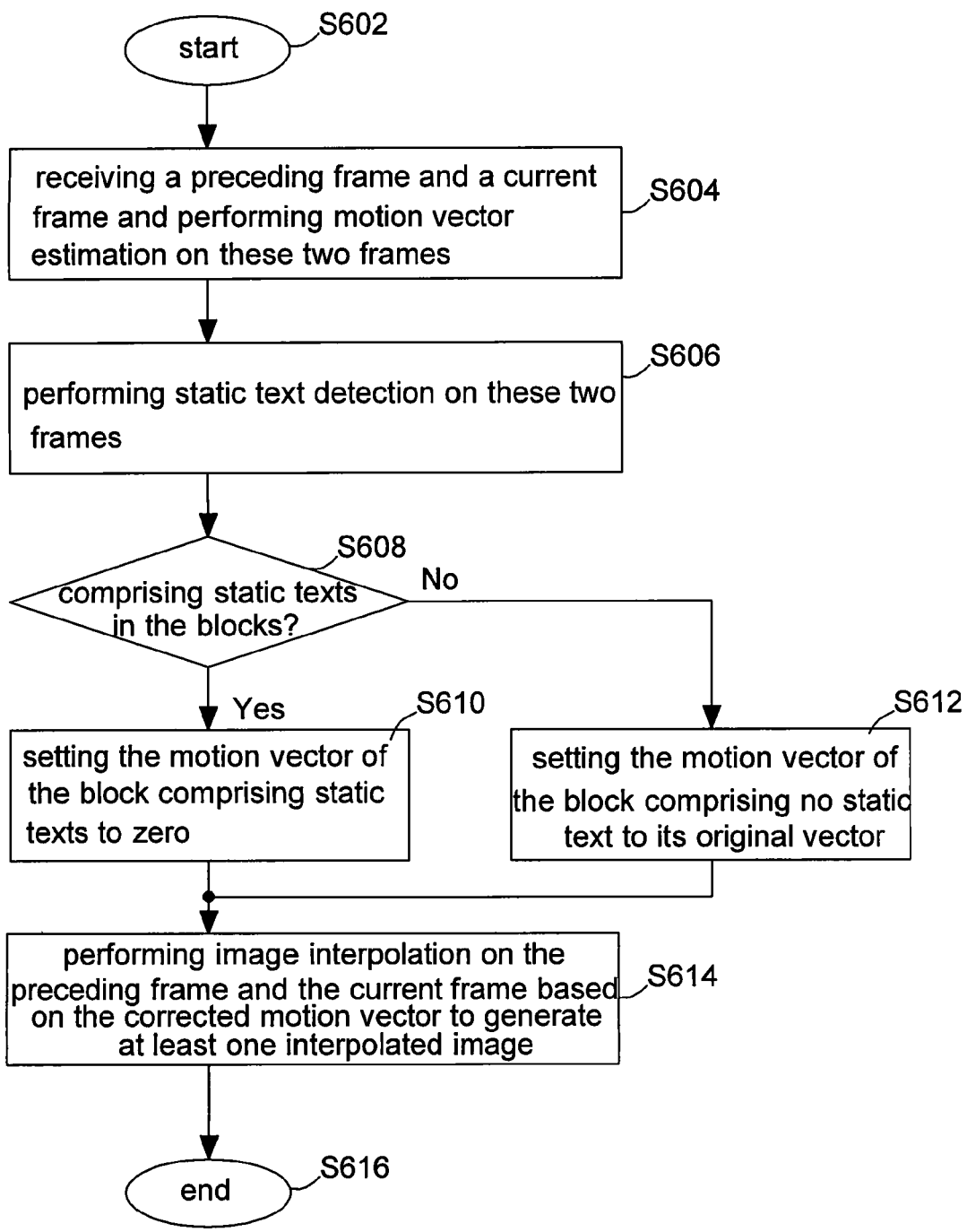
FIG. 6 shows a flow chart illustrating the method for image generation according to one embodiment of the invention.

FIG. 6 shows a flow chart illustrating the method for generating an image according to one embodiment of the invention.

Step S602: start;

Step S604: receiving a preceding frame and a current frame and performing motion vector estimation on these two frames where each frame is divided into a plurality of blocks and the number of blocks and the size of each block of the two frames are the same;

Step S606: performing static text detection on these two frames;

Step S608: determining whether the block and the corresponding block in these two images comprise all or part of static texts or not; if yes, go to Step S610; if not, go to Step S612;

Step S610: setting the motion vector of the block comprising static texts to zero;

Step S612: setting the motion vector of the block comprising no static text to its original vector;

Step S614: performing image interpolation on the preceding frame and the current frame based on the corrected motion vector to generate at least one interpolated image;

Step S616: end.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. An image generating device, comprising: a vector estimation circuit, for performing block matching estimation according to a target block of a first image and a predetermined search block of a second image to generate a temporary motion vector of the target block;
   a static text detecting circuit, for receiving the temporary motion vector of the target block, the first image, and the second image to detect static texts of the first image and the second image and then correcting the temporary motion vector according to the result of detecting static texts to generate a corrected motion vector of the target block; and
   a motion compensation interpolation circuit, for performing image interpolation according to all the corrected motion vectors of the first image, the first image, and the second image to generate at least one interpolated image;
   wherein the static text detecting circuit comprises: a static text angle detecting circuit, for separately detecting the angle of each pixel in each block of the first image and the second image according to at least one angle, and counting the number of pixels having the same angles in each block of the first image and the corresponding block of the second image so as to determine the weight of each block; and
   a data filtering circuit, for determining whether a block comprises any static text or not according to the weight of the block; wherein the static text detecting circuit comprises:
   a first static text angle detecting unit comprising N sets of angle detecting units for detecting whether each block of the second image has the N sets of angles or not; and
   a second static text angle detecting unit comprising N sets of angle detecting units for detecting whether each block of the first image has the N sets of angles or not wherein N is a positive integer less than infinity; wherein the total number of angles included in each block of the second image and the first image is calculated according to the detection result from the first and the second static text angle detecting units and is converted to initial static text weight data.

2. The device according to claim 1, wherein the data filtering circuit comprises: an erosion unit, for receiving the initial static text weight data and eroding the block having a relatively small weight in the initial static text weight data according to a predetermined weighting rule to generate filtered static text flag data; and
   a dilation unit, for receiving the initial static text weight data and dilating the block having a relatively large weight in the initial static text weight data according to a predetermined weighting rule to generate the filtered static text flag data.

3. The device according to claim 2, wherein the static text detecting circuit corrects the temporary motion vector according to the filtered static text flag data to generate the corrected motion vector of the target block.

4. The device according to claim 2, wherein the data filtering circuit further comprises:
   a temporal storage, for storing and detecting the filtered static text flags of a plurality of images and, while the filtered static text flags of Z consecutive images are all the same, determining that the filtered static text flags are correct for the static text detecting circuit to perform motion vector correction where Z is more than 1 and less than infinity.

5. The device according to claim 1, wherein the first image and the second image are divided into the same number of blocks, or the temporary motion vector of the target block is the motion vector having the minimum motion estimation error.

6. A method for generating an image, comprising:
   receiving a second image and a first image and performing motion vector estimation on the first image and the second image;
   performing static text detection on these two images;
   determining whether the block and the corresponding block in these two images comprise all or part of static texts or not; if yes, setting the motion vector of the block comprising static texts to zero; if not, setting the motion vector of the block comprising no static text to its original vector;
   performing image interpolation on the second image and the first image according to the corrected motion vector to generate at least one interpolated image;
   wherein the step of performing static text detection on these two images comprises: separately detecting the angle of each pixel in each block of the first image and the second image according to at least one angle, and counting the number of pixels having the same angles in each block of the first image and the corresponding block of the second image so as to determine the weight of each block; and
   determining whether a block comprises any static text or not according to the weight of the block; wherein the static text detecting circuit comprises:
   a first static text angle detecting unit comprising N sets of angle detecting units for detecting whether each block of the second image has the N sets of angles or not; and a second static text angle detecting unit comprising N sets of angle detecting units for detecting whether each block of the first image has the N sets of angles or not wherein N is a positive integer less than infinity; wherein the total number of angles included in each block of the second image and the first image is calculated according to the detection result from the first and the second static text angle detecting units and is converted to initial static text weight data.

7. The method according to claim 6, wherein each image is divided into a plurality of blocks, the size of each block is the same, and the number of blocks in each image is the same, or the first image and the second image are fields or frames.

8. A static text detecting circuit, comprising:
a vector estimation circuit, for performing block matching estimation according to a target block of a first image and a predetermined search block of a second image to generate a temporary motion vector of the target block;
a static text angle detecting circuit, for receiving the temporary motion vector of the target block, the first image, and the second image to detect static texts of the first image and the second image and then correcting the temporary motion vector according to the result of detecting static texts to generate a corrected motion vector of the target block; and
for separately detecting the angle of each pixel in each block of the first image and the second image from at least one angle and counting the number of the same angles of the pixels in each block of the first image and the corresponding block of the second image so that the weight of each block is determined according to the number of the same angles in the block; and
a motion compensation interpolation circuit, for performing image interpolation according to all the corrected motion vectors of the first image, the first image, and the second image to generate at least one interpolated image;
and a data filtering circuit, for determining whether a block comprises any static text or not according to the weight of the block; wherein the static text detecting circuit comprises:
a first static text angle detecting unit comprising N sets of angle detecting units for detecting whether each block of the second image has the N sets of angles or not; and
a second static text angle detecting unit comprising N sets of angle detecting units for detecting whether each block of the first image has the N sets of angles or not wherein N is a positive integer less than infinity; wherein the total number of angles included in each block of the second image and the first image is calculated according to the detection result from the first and the second static text angle detecting units and is converted to initial static text weight data.

9. The device according to claim 8, wherein a block having a relatively large weight is determined to comprise static texts while a block having a relatively small weight is determined to comprise no static text or a block comprising more angles indicates the weight of the block is larger while a block comprising fewer angles indicates the weight of the block is smaller.

10. The device according to claim 8, wherein the data filtering circuit comprises:
an erosion unit, for receiving the initial static text weight data and eroding the block having a relatively small weight in the initial static text weight data according to a predetermined weighting rule to generate filtered static text flag data; and
a dilation unit, for receiving the initial static text weight data and dilating the block having a relatively large weight in the initial static text weight data according to a predetermined weighting rule to generate the filtered static text flag data.

11. The device according to claim 10, wherein the weighting rule of the erosion unit comprises:
eroding a block while this block has a total of one angle and the surrounding blocks of this block do not comprise a plurality of angles and setting the text flag of this block to false; and/or
eroding a block while the sum of the total number of angles of the surrounding blocks of this block is less than a predetermined value and setting the text flag of this block to false.

12. The device according to claim 10, wherein the weighting rule of the dilation unit comprises:
dilating a block while the blocks on the left and right of this block have a plurality of angles and setting the text flag of this block to true; and/or
dilating a block while the blocks on the top and bottom of this block have a plurality of angles and setting the text flag of this block to true; and/or
dilating a block while the number of blocks having a plurality of angles surrounding this block is more than a predetermined value and setting the text flag of this block to true; and/or
dilating a block while the sum of the total number of angles of the surrounding blocks of this block is more than a predetermined value and setting the text flag of this block to true.

13. The device according to claim 8, wherein the data filtering circuit further determining the number of effective angles in each block of the first image and the second image according to the number of the same angles, comparing the number of effective angles in each block with a predetermined value to decide whether the block comprises any static text or not so as to generate static text flag data as a reference for image motion vector correction.

14. The device according to claim 13, wherein the static text angle detecting circuit comprises:
a first static text angle detecting unit comprising N sets of angle detecting units for detecting whether each block of the second image has the N sets of angles or not;
a second static text angle detecting unit comprising N sets of angle detecting units for detecting whether each block of the first image has the N sets of angles or not wherein N is a positive integer less than infinity;
wherein the initial static text flag data of the second image and the first image is calculated according to the detection results from the first and the second static text angle detecting units.

15. The device according to claim 13, wherein the data filtering circuit comprises:
an erosion unit, for receiving the initial static text flags and eroding the static text flag in the initial static text flag data according to a predetermined weighting rule to generate filtered static text flag data; and
a dilation unit, for receiving the initial static text flag data and dilating the static text flag in the initial static text flag data according to a predetermined weighting rule to generate the filtered static text flag data.

16. The device according to claim 15, wherein the data filtering circuit further comprises:
a temporal storage, for counting the filtered static text flags of a plurality of images and, while the filtered static text flags of Z consecutive images are all the same, determining that the filtered static text flags are correct for the static text detecting circuit to perform motion vector correction where Z is more than 1 and less than infinity.

17. An image generating device, comprising:

a vector estimation circuit, for performing block matching estimation according to a target block of a first image and a predetermined search block of a second image to generate a temporary motion vector of the target block;

a static text detecting circuit, for receiving the temporary motion vector of the target block, the first image, and the second image to detect static texts of the first image and the second image and then correcting the temporary motion vector according to the result of detecting static texts to generate a corrected motion vector of the target block; and a motion compensation interpolation circuit, for performing image interpolation according to all the corrected motion vectors of the first image, the first image, and the second image to generate at least one interpolated image; wherein the static text detecting circuit comprises:

a static text angle detecting circuit, for separately detecting the angle of each pixel in each block of the first image and the second image according to at least one angle, and counting the number of the same angles of the pixels in each block of the first image and the corresponding block of the second image so that the weight of each block is determined according to the number of the same angles in the block; and a data filtering circuit, for determining whether a block comprises any static text or not according to the weight of the block; wherein the static text detecting circuit comprises:

a first static text angle detecting unit comprising N sets of angle detecting units for detecting whether each block of the second image has the N sets of angles or not; and a second static text angle detecting unit comprising N sets of angle detecting units for detecting whether each block of the first image has the N sets of angles or not wherein N is a positive integer less than infinity; wherein the total number of angles included in each block of the second image and the first image is calculated according to the detection result from the first and the second static text angle detecting units and is converted to initial static text weight data.

18. The device according to claim 17, wherein a block having a relatively large weight is determined to comprise static texts while a block having a relatively small weight is determined to comprise no static text, or a block comprising more angles indicates the weight of the block is larger while a block comprising fewer angles indicates the weight of the block is smaller.

19. The device according to claim 18, wherein the weighting rule of the erosion unit comprises:

eroding a block while the block has a total of one angle and the surrounding blocks of the block do not comprise a plurality of angles and setting the text flag of the block to false; and/or eroding a block while the sum of the total number of angles in the surrounding blocks of the block is less than a predetermined value and setting the text flag of the block to false.

20. The device according to claim 18, wherein the weighting rule of the dilation unit comprises:

dilating a block while the blocks on the left and right of this block have a plurality of angles and setting the text flag of this block to true; and/or dilating a block while the blocks on the top and bottom of this block have a plurality of angles and setting the text flag of this block to true; and/or dilating a block while the number of blocks having a plurality of angles surrounding this block is more than a predetermined value and setting the text flag of this block to true; and/or dilating a block while the sum of the total number of angles in the surrounding blocks of this block is more than a predetermined value and setting the text flag of this block to true.

* * * * *